Dec. 12, 1944.    T. C. MORRIS    2,364,744
COLORED ARTICLE AND METHOD OF MAKING THE SAME
Filed May 19, 1941

INVENTOR
Thomas C. Morris
by his attorney
Frederick L. Edmunds

Patented Dec. 12, 1944

2,364,744

UNITED STATES PATENT OFFICE 2,364,744

COLORED ARTICLE AND METHOD OF MAKING THE SAME

Thomas C. Morris, Belmont, Mass., assignor, by mesne assignments, to B. B. Chemical Co., Boston, Mass., a corporation of Massachusetts Application May 19, 1941, Serial No. 394,107

3 Claims. (Cl. 18—47.5)

This invention relates to a molded article having a colored surface and to its method of manufacture, and is herein set forth in connection with the manufacture of a heel, the body portion of which consists essentially of a resin and a finely divided fibrous material.

In the manufacture of footwear heels having a wide range of color are required, and hitherto it has been customary first to make the heels and then to provide them with colored surfaces either by cementing to them covers of sheet material or by applying paint or lacquer to them.

According to the present invention molded heels are colored during the operation of making them. In the illustrated procedure there is first made from a thermosetting resin and a fibrous material a lightly compacted, bibulous, intermediate article in which the resin is uncured, said intermediate article having approximately the relative proportions of the desired finished article and preferably being somewhat larger than the finished article. This intermediate article is coated with a composition containing finely divided thermosetting resin, a filler and coloring matter, said composition being for the most part a suspension of the ingredients in a volatile liquid; and then the dried, coated article is molded to final shape under conditions of time, temperature and pressure sufficient to cure the resin in the body portion of the article as well as in the coating. The bibulous, intermediate article readily takes on a comparatively thick layer of the colored coating material, and the mold, in which the intermediate article is finally shaped, compresses the coating and imparts to it a brilliant gloss. There thus results an article such as a heel of which the colored portion is an integral part and is hence extremely durable under the conditions of wear.

Referring now to the accompanying drawing, Fig. 1 is a perspective of an intermediate article;

The heel is herein shown as a core or body portion 7 of wood flour or sawdust bonded together by a phenol-formaldehyde resin in a shell 9 comprising phenol-formaldehyde resin, cellulose particles, such as cotton flock or alpha pulp in flocked condition, and coloring matter.

In the manufacture of the intermediate article the following ingredients may be used:

| | Pounds |
|---|---|
| Finely divided uncured phenol-formaldehyde resin | 100 |
| Hexamethylenetetramine | 10 |
| Zinc stearate | 2 |

Figure 1:
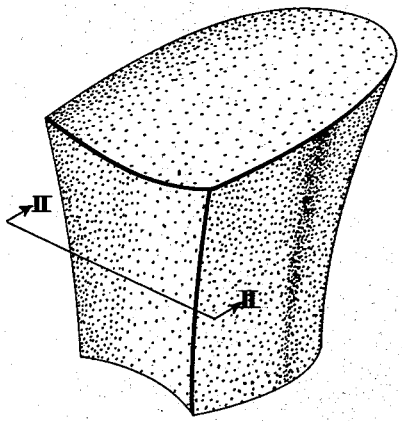

These ingredients are put in a ball mill and ground until from 95% to 100% of the product will pass through a 200-mesh screen. This product, which will be referred to hereafter as the uncured resin, can be converted into a hard, insoluble, infusible substance by heat, the zinc stearate serving as a lubricant for the heated mold in which the curing of the resin takes place. Although one specific thermosetting resin, namely a phenol-formaldehyde resin, has been referred to above, it should be understood that substituted phenols likewise may be employed and that any suitable thermosetting resin having the desired qualities may be used such, for example, as urea-aldehyde resins or thiourea-aldehyde resins or mixtures of the two last-named resins. An uncured resin having been prepared by the above or any suitable process, a molding powder is made which consists, if an article such as a heel is to be produced, of from 5 to 35 parts by weight of finely divided uncured resin and 95 to 65 parts by weight of a finely divided fibrous material such as wood flour or sawdust. A measured amount of molding powder, preferably heated from 66° to 93° C., is put in a mold, which may be of the same size and shape as the curing mold and is maintained at the temperature last given, and is subjected momentarily or for an interval of a few seconds to a pressure of 1,000 to 2,000 pounds per square inch to cause the warm resin to cement together the particles of wood flour, the temperature and the time interval being insufficient to effect any appreciable curing of the resin. Inasmuch as the resin is uncured and the pressure is applied for so short an interval that no considerable flow of the resin takes place, the intermediate article (Fig. 1) thus made expands somewhat when removed from the mold but has approximately the relative proportions of the finished article. It is so lightly compacted as to be very bibulous, a quality which greatly facilitates the subsequent coating of it. The manufacture of the intermediate article, which has been briefly described above, is described more in detail in Letters Patent No. 2,330,233, granted September 28, 1943, on an application filed in my name.

The expanded bibulous intermediate article may be coated with a mixture of ingredients in suspension, of which the two formulas given below, one for black and the other for lighter colors, are examples.

FORMULA No. 1

Part A

| | Parts by weight |
|---|---|
| Uncured phenol-formaldehyde resin | 450 |
| Kosmos black | 45 |
| Calco black 1500 V | 4.5 |
| Wood flour | 225 |
| Zinc stearate | 4.5 |
| Hydrated lime | 4.5 |
| Hexamethylenetetramine | 45 |
| | 778.5 |

Kosmos black is a color carbon black. Calco black is a resin-soluble dye. Hydrated lime is an accelerator to aid the hexamethylenetetramine. All except the hexamethylenetetramine are mixed together and formed into a sheet in a rubber mill. The sheet is ground to a powder and then, together with the hexamethylenetetramine, is pulverized in a ball mill until all the product will pass through a 60-mesh screen and 95% of it will pass through a 200-mesh screen.

Part B

| | Parts by weight |
|---|---|
| Part A | 170 |
| Cotton flock | 17 |
| Amberol HH 1 (70% solids) | 4.3 |
| Low boiling naphtha | 100 |
| Benzol | 100 |
| | 391.3 |

The function of the amberol, a resin which is put out by Resinous Products & Chemical Co., Inc., of Philadelphia, is soluble in the naphtha-benzol mixture and will cure under heat, is to make the coating of powdered material stick to the intermediate article when the coating is dry.

FORMULA No. 2

Part A

| | Parts by weight |
|---|---|
| Uncured phenol-formaldehyde resin | 450 |
| Lithopone | 200 |
| A resin-soluble dye of a color other than black | 18 to 27 |
| Wood flour | 225 |
| Zinc stearate | 4.5 |
| Zinc oxide | 27 |
| Hexamethylenetetramine | 45 |

Part B

| | Parts by weight |
|---|---|
| Part A | 220 |
| Cotton flock | 11 |
| Amberol HH 1 (70% solids) | 4.3 |
| Low boiling naphtha | 100 |
| Benzol | 100 |

When colors lighter than black, such as red, blue, green, etc., are used a light-colored pigment, such as lithopone, serves as a sort of background to make the color of the dye show up well. Whether the dye is black or some lighter color, it is desirable to use with it a pigment in order to increase the effectiveness of the dye and thus impart to the surface of the article a brilliant color.

The intermediate article is dipped in the suspension, the dipping being momentary, and the drying fairly complete in a few minutes after the article has been removed from the suspension.

Figure 2:
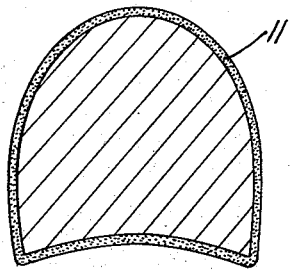
Fig. 2 is a cross-section of the intermediate article after it has been coated, said intermediate article being ready to be molded to final shape.
Figure 3:
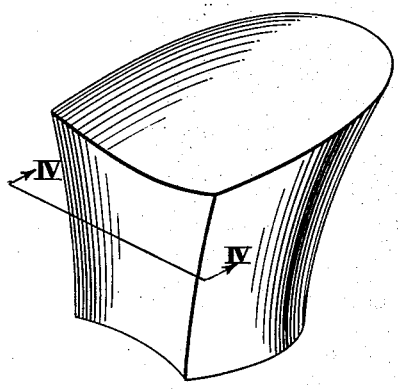
Fig. 3 is a perspective of a finished molded heel having a glossy, colored surface.
Figure 4:
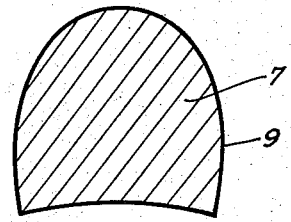
Fig. 4 is a cross-section of the finished heel with its core or body portion and its colored shell.

As has been stated, the intermediate article is lightly compacted and very bibulous, this latter quality greatly facilitating the coating of it by immersing it in a suspension. The ease with which the intermediate article takes on a coating and the presence in the coating material of the Amberol and the cellulose particles contribute to the production of a coating, indicated at 11 in Fig. 2, the thickness of which is considerable, being of the order of .0625 of an inch. The coating is a fragile or friable one, the particles of which are held together and the coating as a whole held in place largely by the Amberol. This application of a thick coating to the intermediate article by a quick immersion is a very desirable feature and effects a saving in time, labor and apparatus over coating the intermediate article by spraying or brushing. Moreover, the coating produced by immersion is of uniform thickness, a result difficult to obtain by the other methods.

The coated intermediate article is put into the curing mold, which may be the same mold in which the intermediate article was made, and is subjected to conditions of time, pressure and temperature sufficient to mold it to final shape and to cure the resin both in the body portion of the heel and in the coating. In this final molding, the cellulose particles improve the flow qualities of the coating material so that the final molded surface is smooth. There results a heel which consists of a core or body portion 7 of wood flour and cured resin and a shell 9 of a thickness of about .02 of an inch consisting essentially of cured resin, a filler of cellulose particles, and coloring matter, the surface of the heel being colored and glossy.

The method of manufacturing a molded article, including the making and coating of an intermediate article of the nature described above and molding the coated intermediate article, is disclosed and claimed in the prior patent identified above.

Having thus described my invention, what I claim as new and desire to secure by Letters Patent of the United States is:

1. The method of making an article such as a heel having a colored surface which comprises making from a mixture of finely divided thermosetting resin and fibrous material a lightly compacted, bibulous intermediate article in which the resin is uncured, said intermediate article having approximately the relative proportions of the desired finished article, forming on said intermediate article a comparatively thick, friable coating by immersing it in a liquid which carries in suspension thermosetting resin, cellulose particles and coloring material, and in solution a second thermosetting resin, and molding the coated intermediate article to final shape under conditions of time, temperature and pressure sufficient to cure the resin in the body portion of the article and in the coating.

2. A molded heel the body portion of which consists of a cured resin and fibrous material, said body portion having integral with it a coating containing a cured resin, cellulose particles and coloring matter.

3. A molded heel the body portion of which consists of a cured resin and fibrous material, said body portion having integral with it a coating containing a cured resin, cellulose particles, a pigment and a dye.

THOMAS C. MORRIS.